(12) United States Patent
Chen et al.

(10) Patent No.: US 8,212,443 B2
(45) Date of Patent: Jul. 3, 2012

(54) MOTOR AND HOUSING THEREOF

(75) Inventors: Wei-Ren Chen, Taoyuan Hsien (TW); Hung-Chi Chen, Taoyuan Hsien (TW)

(73) Assignee: Delta Electronics, Inc., Kuei San, Taoyuan Hsien (TW)

( * ) Notice: Subject to any disclaimer, the term of this patent is extended or adjusted under 35 U.S.C. 154(b) by 441 days.

(21) Appl. No.: 12/241,803

(22) Filed: Sep. 30, 2008

(65) Prior Publication Data
US 2009/0115273 A1    May 7, 2009

(30) Foreign Application Priority Data
Nov. 14, 2007   (CN) .......................... 2007 1 0169897

(51) Int. Cl.
*H02K 5/10*      (2006.01)
(52) U.S. Cl. ............................................ 310/89; 310/88
(58) Field of Classification Search .................... 310/88, 310/89, 87
See application file for complete search history.

(56) References Cited

U.S. PATENT DOCUMENTS

| 4,588,086 | A | * | 5/1986 | Coe .............................. 206/308.3 |
| 5,553,711 | A | * | 9/1996 | Lin et al. ......................... 206/710 |
| 6,031,306 | A | * | 2/2000 | Permuy ........................ 310/67 R |
| 6,286,684 | B1 | * | 9/2001 | Brooks et al. .................... 206/710 |
| 6,550,619 | B2 | * | 4/2003 | Bores et al. .................... 206/710 |
| 7,105,966 | B2 | * | 9/2006 | Kopf et al. ....................... 310/89 |
| 7,245,056 | B2 | * | 7/2007 | Matsumoto .................. 310/309 |
| 7,291,951 | B2 | * | 11/2007 | Takiguchi et al. .......... 310/75 R |
| 2002/0109426 | A1 | * | 8/2002 | Peter et al. ....................... 310/89 |
| 2005/0040715 | A1 | * | 2/2005 | Nesic .............................. 310/71 |
| 2005/0134130 | A1 | * | 6/2005 | Tsai et al. ........................ 310/89 |

* cited by examiner

*Primary Examiner* — Quyen Leung
*Assistant Examiner* — Naishadh Desai
(74) *Attorney, Agent, or Firm* — Muncy, Geissler, Olds & Lowe, PLLC

(57) ABSTRACT

A motor includes a motor body and a housing for covering and accommodating the motor body. The housing includes a seat and a cover. The seat has at least one first connecting portion disposed at the circumference of the seat, and the cover has at least one second connecting portion disposed at the circumference of the cover and corresponding to the first connecting portion. The first and second connecting portions are connected by the relative movement of the seat and the cover, so that the seat and the cover can be combined tightly.

12 Claims, 7 Drawing Sheets

MOTOR AND HOUSING THEREOF

CROSS REFERENCE TO RELATED APPLICATIONS

This Non-provisional application claims priority under 35 U.S.C. §119(a) on Patent Application No(s). 200710169897.0, filed in People's Republic of China on Nov. 14, 2007, the entire contents of which are hereby incorporated by reference.

BACKGROUND OF THE INVENTION

1. Field of Invention

The present invention relates to a motor and a housing thereof, and in particular to a motor for vehicles and the housing thereof.

2. Related Art

Motors are commonly used to be devices for converting electricity into mechanical energy and are widely applied to various components such as fans, CD-ROM drives or hard disk drives. Currently, there are various kinds of motors. Depending on different circumstances, the housings of the motors have different structures to achieve different purposes. For example, the housing of the motor for vehicles needs good air-tightness once the motor is in moist warn environment. Therefore, the components used in assembling the housing of the motor for the vehicles affect the production cost and lifespan of the products.

As shown in FIG. 1, a conventional motor 1 for the vehicle includes a seat 11 and a cover 12. The seat 11 and the cover 12 are combined tightly through a plurality of rivets 13. In this case, a machine is needed to create the rivets 13 for combining the seat 11 and the cover 12. Thus, the production cost will arise because of the machine.

Alternatively, the seat and the cover may be combined tightly through several screws (not shown). However, using this method will increase the production time, and the lifetime of the screws also affects the lifespan of products.

SUMMARY OF THE INVENTION

In view of the foregoing, the present invention is to provide a motor and a housing thereof that can ensure the air-tightness without using additional tools and locking components so as to decrease the production cost and production time and extend the lifespan of products.

To achieve the above, a housing of a motor according to the present invention includes a seat and a cover. The circumference of the seat has at least one first connecting portion. The circumference of the cover has at least one second connecting portion disposed corresponding to the first connecting portion. The first and second connecting portions are connected by the relative movement of the seat and the cover so that the seat and the cover are combined tightly.

To achieve the above, the present invention also discloses a motor including a motor body and a housing thereof covering and accommodating the motor body. The housing includes a seat and a cover. The circumference of the seat has at least one first connecting portion. The circumference of the cover has at least one second connecting portion disposed corresponding to the first connecting portion. The first and second connecting portions are connected by the relative movement of the seat and the cover, so that the seat and the cover are combined tightly.

As mentioned above, the seat and the cover of the present invention are connected to each other by the relative movement of the corresponding connecting portions on the seat and cover. Compared with the prior art, the present invention can ensure the air-tightness of the motor without using additional tools and locking components, thereby decreasing the production cost and production time and also extending the lifespan of the products.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

The First Embodiment

Figure 1:
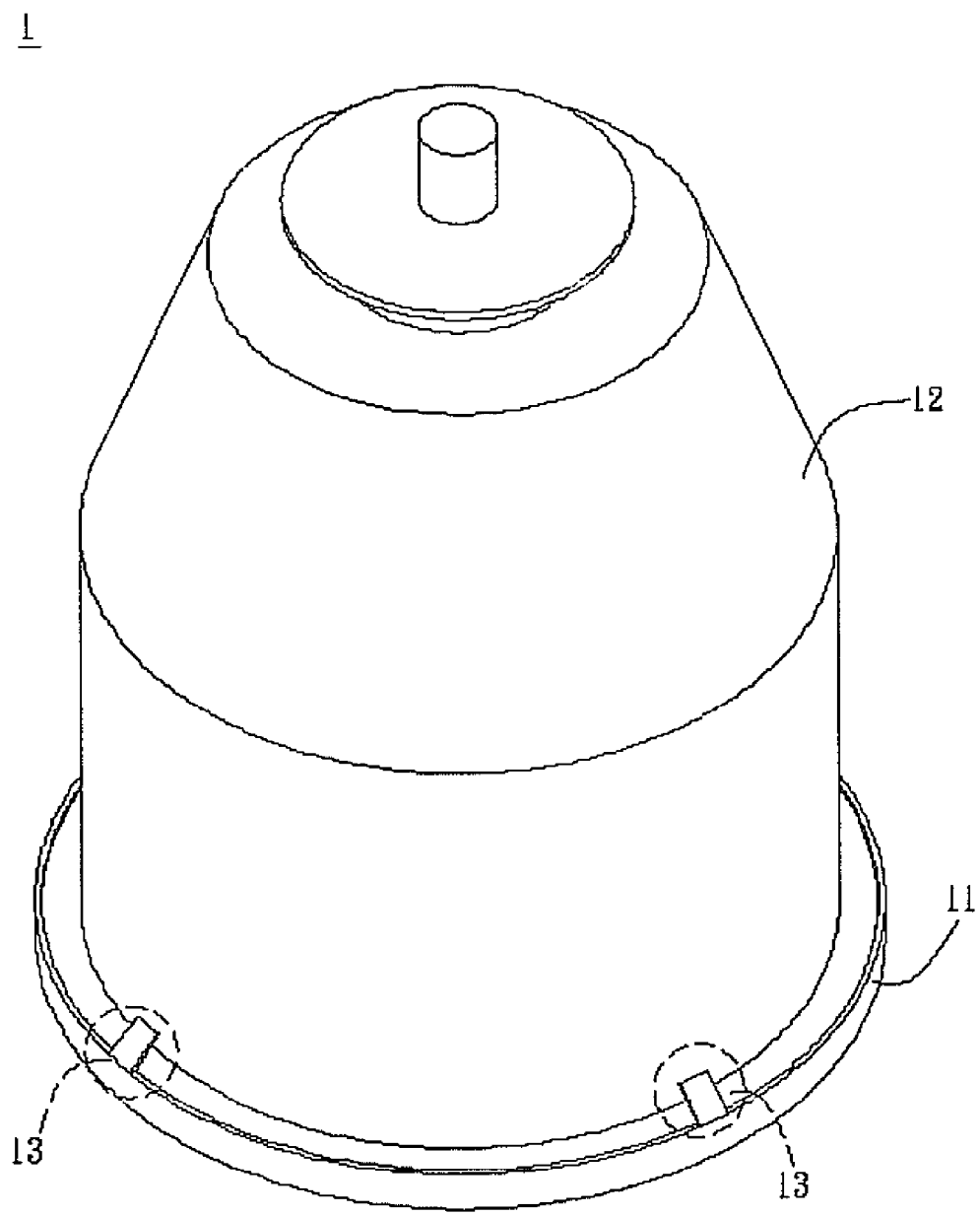
FIG. 1 is a schematic diagram of a conventional motor for vehicles.
Figure 2A:
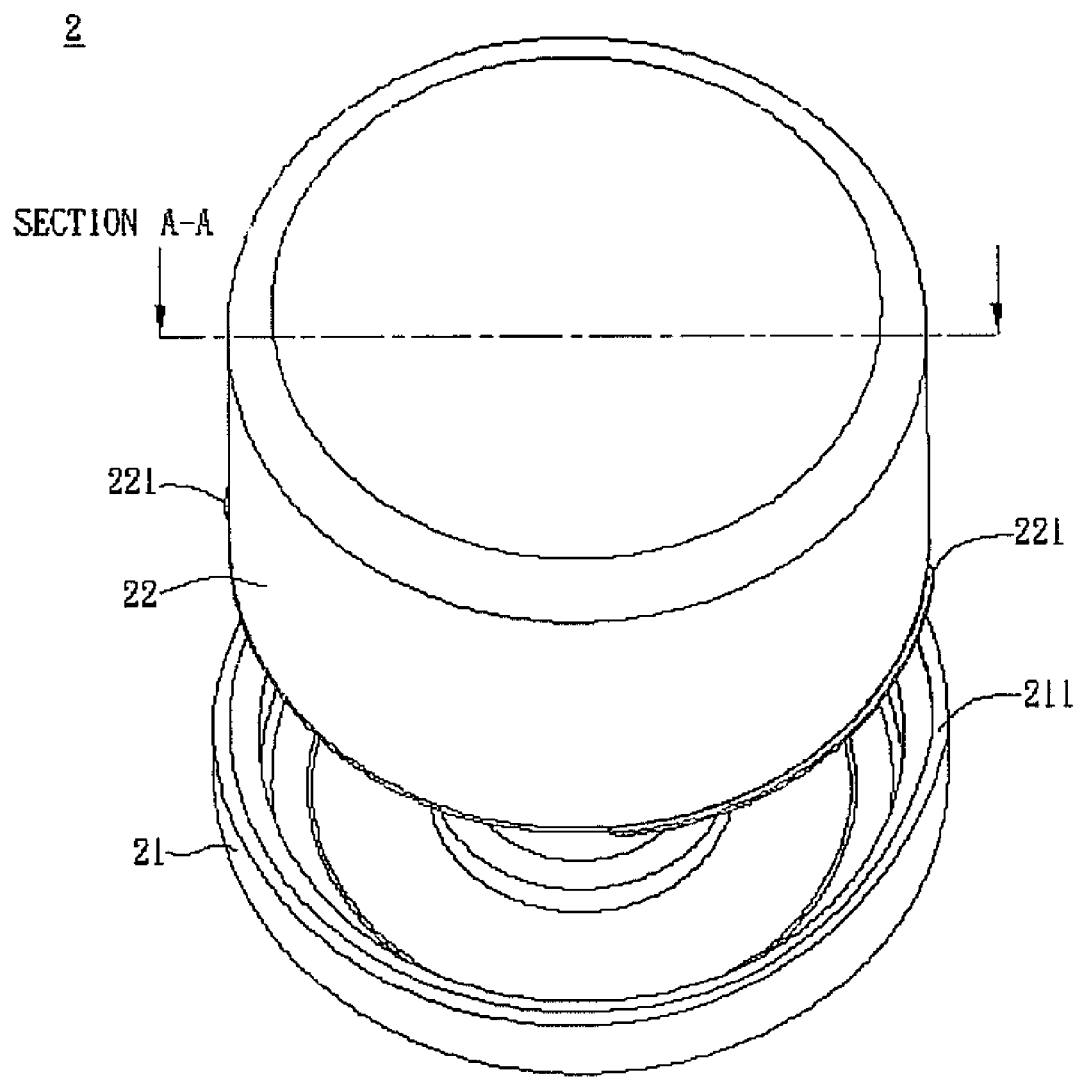
FIG. 2A is a schematic diagram of a motor for a vehicle according to a first embodiment of the present invention.
Figure 2B:
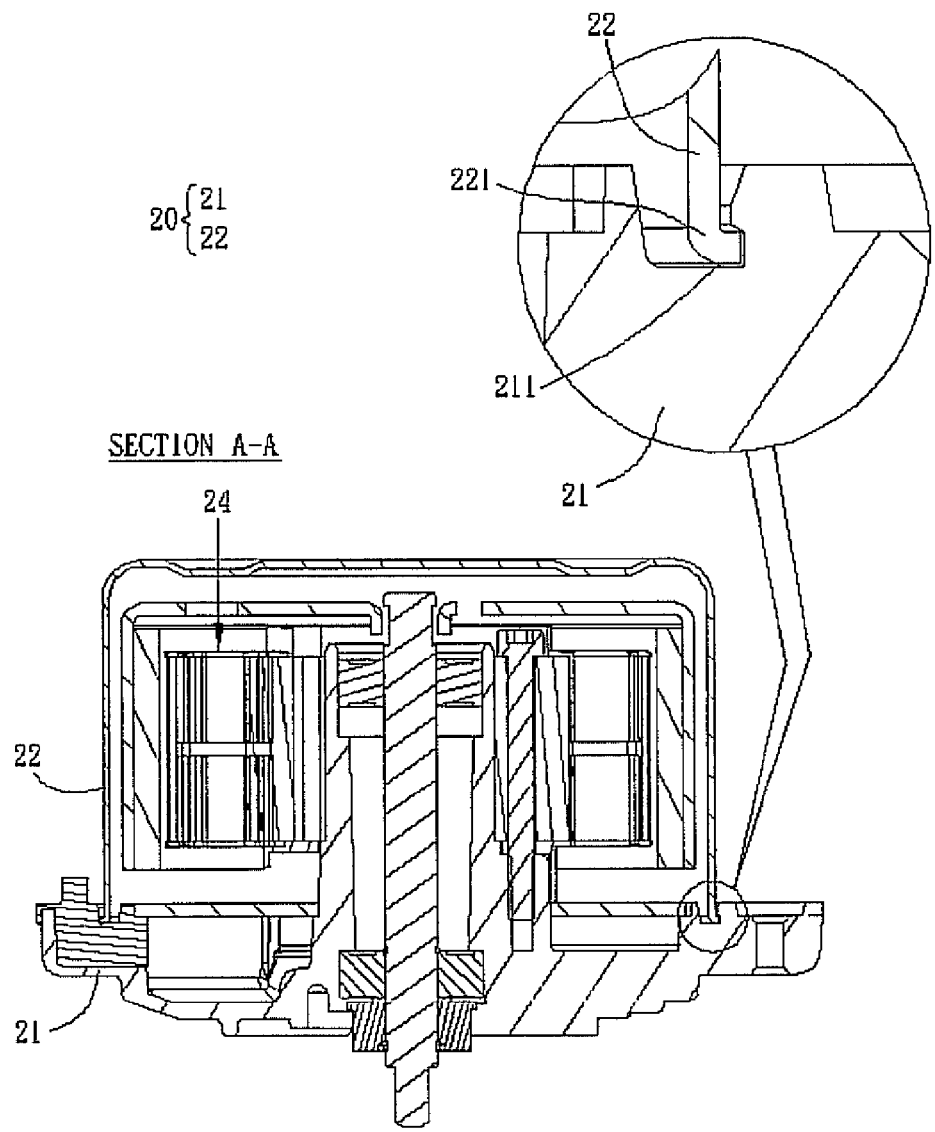
FIG. 2B is a sectional diagram taken along the section A-A in FIG. 2A.

Referring both to FIGS. 2A and 2B, a motor 2 for a vehicle according to a first embodiment of the present invention includes a motor body 24 and a housing 20. Because the technical features of the present invention do not consist in the motor body 24, and the sorts of the motor body 24 are not limited. In the figures, some elements of the motor body 24 will be omitted for brevity. The motor 2 can be an inner-rotor motor or an outer-rotor motor. In the embodiment, the motor 2 is an outer-rotor motor. The housing 20 covers and accommodates the motor body 24. The housing 20 includes a seat 21 and a cover 22.

The circumference of the seat 21 has at least one first connecting portion 211. The circumference of the cover 22 has at least one second connecting portion 221, which is disposed corresponding to the first connecting portion 211. The first connecting portion 211 and the second connecting portion 221 can be respectively a recess and a flange, which can assemble with each other. In the embodiment, the second connecting portion 221 is a recess and the first connecting portion 211 is a flange, for example. Alternatively, the second connecting portion 221 can be a flange and the first connecting portion 211 can be a recess. When the cover 22 and the seat 21 are pressed to assemble with each other, the second connecting portion 221 (the flange) can be deformed slightly due to the pressure produced by the edge of the first connecting portion 211. Then, the second connecting portion 221 is continuously pressed so as to connect the first connecting portion 211 and the second connecting portion 221. At the meantime, the second connecting portion 221 is recovered from the deformation so that the second connecting portion 221 can be assembled tightly with the first connecting portion 211. Accordingly, the seat 21 and the cover 22 are combined to each other. In addition, a simple jig for pressing may selectively be provided for helping the assembling process.

After being pressed, the first connecting portion 211 and the second connecting portion 221 are connected by tight fitting or wedging, thereby providing the limitations of the axial and radial movements between the seat 21 and the cover 22. In addition, an adhesive agent can be disposed between the first connecting portion 211 and the second connecting portion 221 to strengthen their connection. Furthermore, one end of the second connecting portion 221 (the flange) can have a hook structure and the first connecting portion 211 (the recess) can have a limiting structure for connecting to the hook portion, thereby increasing the connection strength.

In the embodiment, the second connecting portion 221 is disposed at the outer side of the circumference of the cover 22. Alternatively, the second connecting portion 221 can be disposed at the inner side of the circumference of the cover 22, and the first connecting portion 211 can be disposed on the seat 21 corresponding to the second connecting portion 221.

The Second Embodiment

Figure 3A:
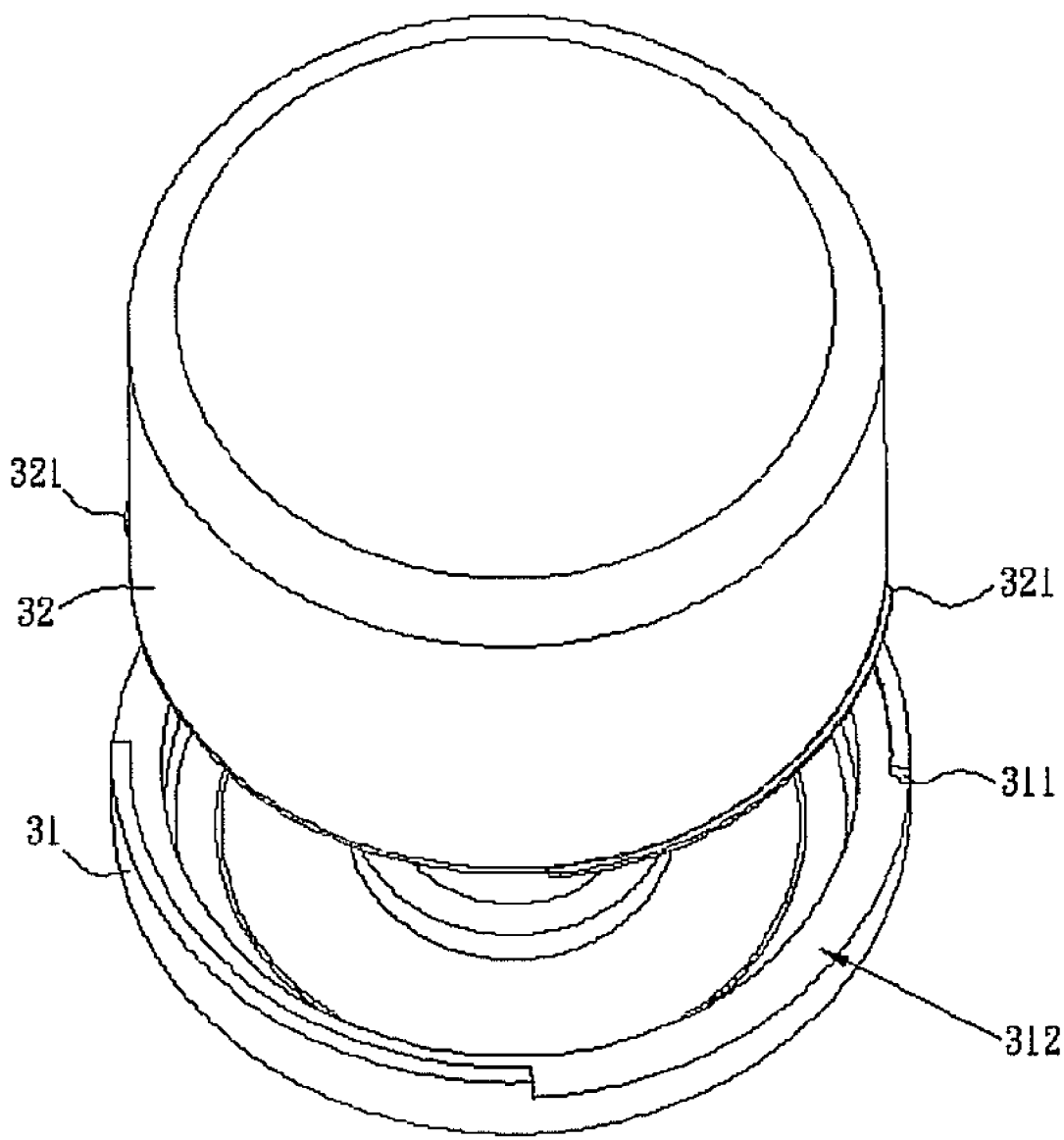
FIG. 3A is a schematic diagram of a housing of a motor for a vehicle according to a second embodiment of the present invention.
Figure 3B:
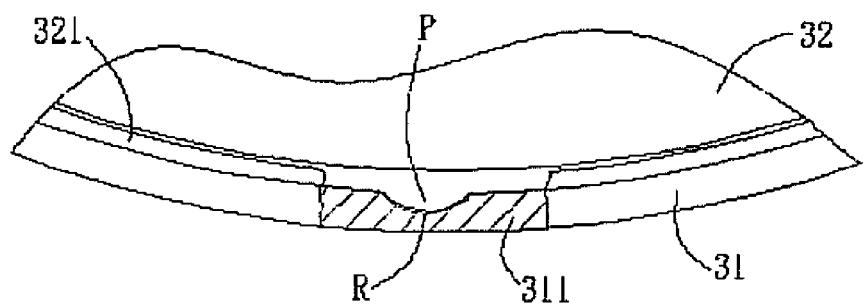
FIG. 3B and FIG. 3C show the connection of the wedging protrusion and the wedging recess of the housing shown in FIG. 3A.
Figure 3C:
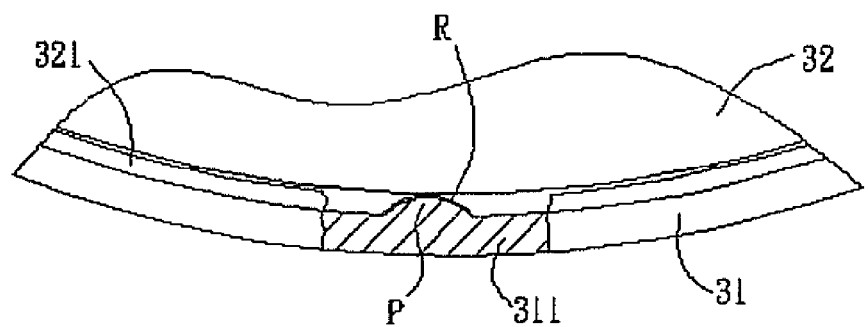
Figure 3D:
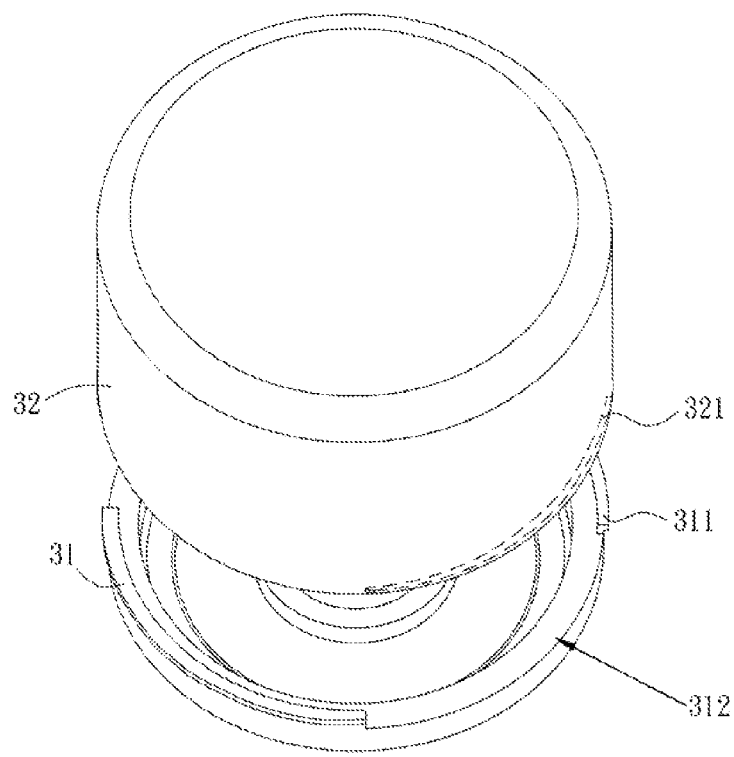
FIG. 3D shows another embodiment thereof.

As shown in FIG. 3A, a housing 30 of a motor for a vehicle includes a seat 31 and a cover 32. The seat 31 has at least one first connecting portion 311 and an opening 312. The cover 32 has at least one second connecting portion 321. In the embodiment, the first connecting portion 311 is a recess and the second connecting portion 321 is a flange, for example. In the embodiment, the second connecting portion 321 is disposed at the outer side of the circumference of the cover 32. Alternatively, as shown in FIG. 3D, the second connecting portion 321 can be disposed at the inner side of the circumference of the cover 32, and the first connecting portion 311 can be disposed on the seat 31 corresponding to the second connecting portion 321.

In the embodiment, the first connecting portion 311 and the second connecting portion 321 are connected by way of rotation. Firstly, the second connecting portion 321 is aligned with and axially connected to the opening 312 of the seat 31. Then, the cover 32 is rotated corresponding to the seat 31 so that the second connecting portion 321 can be inserted into the first connecting portion 311. Accordingly, the seat 31 and the cover 32 are connected to each other with the limitation of the axial movement.

In addition, the limitation of the radial movement can be provided to avoid the relative rotation between the cover 32 and the seat 31 and the loosing of the second connecting portion 321 from the opening 312. Please refer to FIG. 3B which shows the connection of the first connecting portion 311 and the second connecting portion 321. The second connecting portion 321 has a wedging protrusion P and the first connecting portion 311 has a wedging recess R. The wedging protrusion P is wedged in the wedging recess R tightly so as to provide the limitation of the radial movement between the cover 32 and the seat 31. Moreover, the first connecting portion 311 and the second connecting portion 321 can also be connected by adhesion for obtaining stronger connection strength. Alternatively, the wedging protrusion P can be disposed at the first connecting portion 311 and the wedging recess R can be disposed at the second connecting portion 321, as shown in FIG. 3C.

The Third Embodiment

Figure 4:
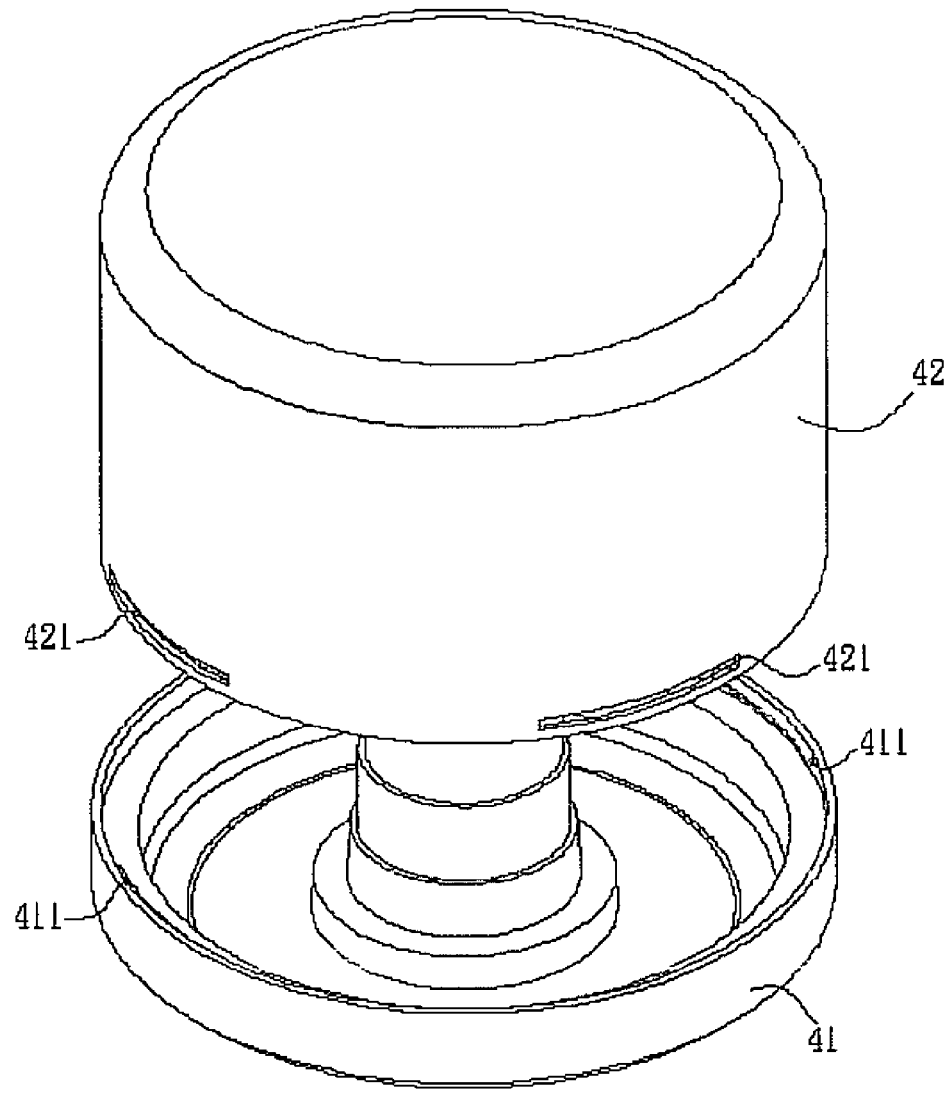
FIG. 4 is a schematic diagram of a housing of a motor for a vehicle according to a third embodiment of the present invention.

FIG. 4 shows a housing 40 of a motor for a vehicle according to a third embodiment of the present invention. The difference between the housing 40 and the above-mentioned housings 20 and 30 is in that the second connecting portion 421 of the cover 42 includes a plurality of discontinuous recesses, and the seat 41 includes a plurality of discontinuous first connecting portions 411 (such as flanges) disposed corresponding to the recesses, respectively. In the embodiment, the recesses are disposed at the outer side of the circumference of the cover 42. In order to assemble the housing 40 with the cover 42, the first connecting portion 411 and the second connecting portion 421 are aligned with each other firstly. Then, the cover 42 and the seat 41 are axially pressed to cause the relative movement between the cover 42 and the seat 41, so that the first connecting portion 411 and the second connecting portion 421 are connected to each other and the cover 42 is connected to the seat 41 accordingly. Alternatively, if the diameter of the seat 41 is smaller than that of the cover 42, the recesses can be disposed at the inner side of the circumference of the cover 42 and the flanges of the seat 41 are also disposed corresponding to the recesses.

In summary, the seat and cover of the present invention are connected to each other by the relative movement of the corresponding connecting portions on the seat and cover. Compared with the prior art, the present invention can ensure the air-tightness of the motor without using additional tools and locking components, thereby decreasing the production cost and production time and also extending the lifespan of the products.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A housing of a motor, the housing comprising:
    a seat comprising a single first connecting portion continuously disposed at a circumference thereof, wherein the first connecting portion is ring shaped; and
    a cover comprising at least two second connecting portions symmetrically and discontinuously disposed at a circumference thereof and corresponding to the first connecting portion,
    wherein one of the first connecting portion and the second connecting portion has a wedging protrusion, and the other one of the first connecting portion and the second connecting portion has a wedging recess, the first connecting portion and the second connecting portion are connected by pressing and the wedging protrusion is wedged in the wedging recess so that the seat and the cover are combined tightly.

2. The housing as recited in claim 1, wherein the second connecting portion is disposed at an outer side of the circumference of the cover, and the first connecting portion is disposed corresponding to the second connecting portion.

3. The housing as recited in claim 1, wherein the first connecting portion is disposed at an outer side of the circumference of the seat, and the second connecting portion is disposed at an inner side of the circumference of the cover.

4. The housing as recited in claim 1, wherein the first connecting portion is a flange or a recess, and the second connecting portions are recesses or flanges accordingly.

5. The housing as recited in claim 1, wherein one end of the first connecting portion has a hook structure and the second connecting portion has a limiting structure corresponding to the hook portion, and vice versa.

6. The housing as recited in claim 1, wherein the seat is connected to the cover by tightly fitting, wedging or adhering.

7. A motor, comprising:
- a motor body; and
- a housing covering and accommodating the motor body, the housing comprising:
  - a seat comprising a single first connecting portion continuously disposed at a circumference thereof, wherein the first connecting portion is ring shaped, and
  - a cover comprising at least two second connecting portions symmetrically and discontinuously disposed at a circumference thereof corresponding to the first connecting portion,
  - wherein one of the first connecting portion and the second connecting portion has a wedging protrusion, and the other one of the first connecting portion and the second connecting portion has a wedging recess, the first connecting portion and the second connecting portion are connected by pressing and the wedging protrusion is wedged in the wedging recess so that the seat and the cover are combined tightly.

8. The motor as recited in claim 7, wherein the second connecting portion is disposed at an outer side of the circumference of the cover, and the first connecting portion is disposed corresponding to the second connecting portion.

9. The motor as recited in claim 7, wherein the first connecting portion is disposed at an outer side of the circumference of the seat, and the second connecting portion is disposed at an inner side of the circumference of the cover.

10. The motor as recited in claim 7, wherein the first connecting portion is a flange or a recess, and the second connecting portion are recesses or flanges accordingly.

11. The motor as recited in claim 7, wherein one end of the first connecting portion has a hook structure and the second connecting portion has a limiting structure corresponding to the hook portion, and vice versa.

12. The motor as recited in claim 7, wherein the first connecting portion is connected to the second connecting portion by tightly fitting, wedging or adhering.

* * * * *